(12) United States Patent
Stumpf et al.

(10) Patent No.: US 11,763,408 B2
(45) Date of Patent: Sep. 19, 2023

(54) ENHANCED DESTINATION INFORMATION FOR RIDESHARE SERVICE

(71) Applicant: GM Cruise Holdings LLC, San Francisco, CA (US)

(72) Inventors: Katherine Mary Stumpf, San Francisco, CA (US); Reed Townsend Jones, San Francisco, CA (US); Andrew David Acosta, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 41 days.

(21) Appl. No.: 17/100,087

(22) Filed: Nov. 20, 2020

(65) Prior Publication Data
US 2022/0164911 A1    May 26, 2022

(51) Int. Cl.
| | |
|---|---|
| *G06Q 50/30* | (2012.01) |
| *G06F 16/9537* | (2019.01) |
| *G06Q 50/14* | (2012.01) |
| *G06Q 30/0204* | (2023.01) |
| *G06Q 30/0601* | (2023.01) |
| *G06N 20/00* | (2019.01) |
| *G06Q 50/26* | (2012.01) |

(Continued)

(52) U.S. Cl.
CPC ......... *G06Q 50/30* (2013.01); *G06F 16/9537* (2019.01); *G06N 20/00* (2019.01); *G06Q 30/0205* (2013.01); *G06Q 30/0631* (2013.01); *G06Q 50/14* (2013.01); *G06Q 50/26* (2013.01); *G05D 1/0231* (2013.01); *G08G 1/0112* (2013.01)

(58) Field of Classification Search
CPC ............... G06Q 50/30; G06Q 30/0205; G06Q 30/0631; G06Q 50/14; G06Q 50/26; G06F 16/9537; G06N 20/00; G05D 1/0231; G08G 1/0112; G08G 1/202; H04L 67/306; H04W 4/024; H04W 4/44
USPC ........................................................ 705/7.34
See application file for complete search history.

(56) References Cited

U.S. PATENT DOCUMENTS

| | | | |
|---|---|---|---|
| 8,150,617 B2 | 4/2012 | Manber et al. | |
| 10,152,053 B1 * | 12/2018 | Smith | ..................... G06Q 10/02 |

(Continued)

OTHER PUBLICATIONS

Ride-Sharing App Focused on Women's Safety Expands to DC. University Wire [Carlsbad] Aug. 31, 2018.*

(Continued)

*Primary Examiner* — Timothy Padot
(74) *Attorney, Agent, or Firm* — Akona IP

(57) ABSTRACT

The present disclosure provides a method comprising receiving a ride request from a user having a user profile, the ride request including a requested drop-off location within a service area and the user profile specifying at least one drop-off location preference parameter; querying a database to obtain data regarding a condition of the requested drop-off location, wherein the data is collected by a plurality of vehicles traversing the service area and equipped with at least one sensor and at least one imaging device; determining whether the obtained data satisfies the at least one drop-off location preference parameter; and determining at least one alternative drop-off location within a first distance from the requested drop-off location if the obtained data does not satisfy the at least one drop-off location preference parameter.

17 Claims, 4 Drawing Sheets

(51) Int. Cl.
G05D 1/02 (2020.01)
G08G 1/01 (2006.01)

(56) References Cited

U.S. PATENT DOCUMENTS

| | | | |
|---|---|---|---|
| 2014/0058896 A1* | 2/2014 | Jung | G06Q 30/0623 |
| | | | 705/26.61 |
| 2018/0202822 A1* | 7/2018 | DeLizio | B60R 25/24 |
| 2018/0211541 A1* | 7/2018 | Rakah | G08G 1/148 |
| 2019/0287034 A1* | 9/2019 | Mitsumaki | G06F 16/22 |
| 2019/0306463 A1* | 10/2019 | Zuckerman | G06V 20/46 |
| 2020/0057438 A1* | 2/2020 | Engle | G05D 1/0088 |
| 2020/0160709 A1* | 5/2020 | Ramot | B60W 60/00253 |
| 2020/0240804 A1* | 7/2020 | Rao | G06Q 10/047 |
| 2020/0372590 A1* | 11/2020 | Chowdhary | G06F 16/24578 |

OTHER PUBLICATIONS

CARCOs SafeRIDE Certified, an Ongoing Driverand Vehicle Monitoring Service, Ensures Safety and Compliance in the Rideshare Industry. Financial Services Monitor Worldwide [Amman] Jan. 9, 2018.*

A driver and riders matching approach. Yousaf, Jamal; Juanzi Li. 2014 11th Web Information System and Application Conference (WISA). Proceedings: 53-60;269. IEEE Computer Society. (2014).*

Uber partners with app to map areas on safety. Janwalkar, Mayura. Indian Express [Mumbai] Feb. 24, 2015.*

* cited by examiner

ENHANCED DESTINATION INFORMATION FOR RIDESHARE SERVICE

TECHNICAL FIELD OF THE DISCLOSURE

The present disclosure relates generally to rideshare services and, more specifically, to devices and methods for enabling delivery of enhanced information about a selected destination to a rideshare service user.

BACKGROUND

Rideshare service users may benefit from access to real time information regarding their destination, such as the weather, pedestrian density, lighting conditions, accessibility, etc., prior to selecting and/or confirming a specific drop-off point at the destination. Access to and provision of such information would enable users to better plan for their trip or to modify their selected drop-off point.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1:
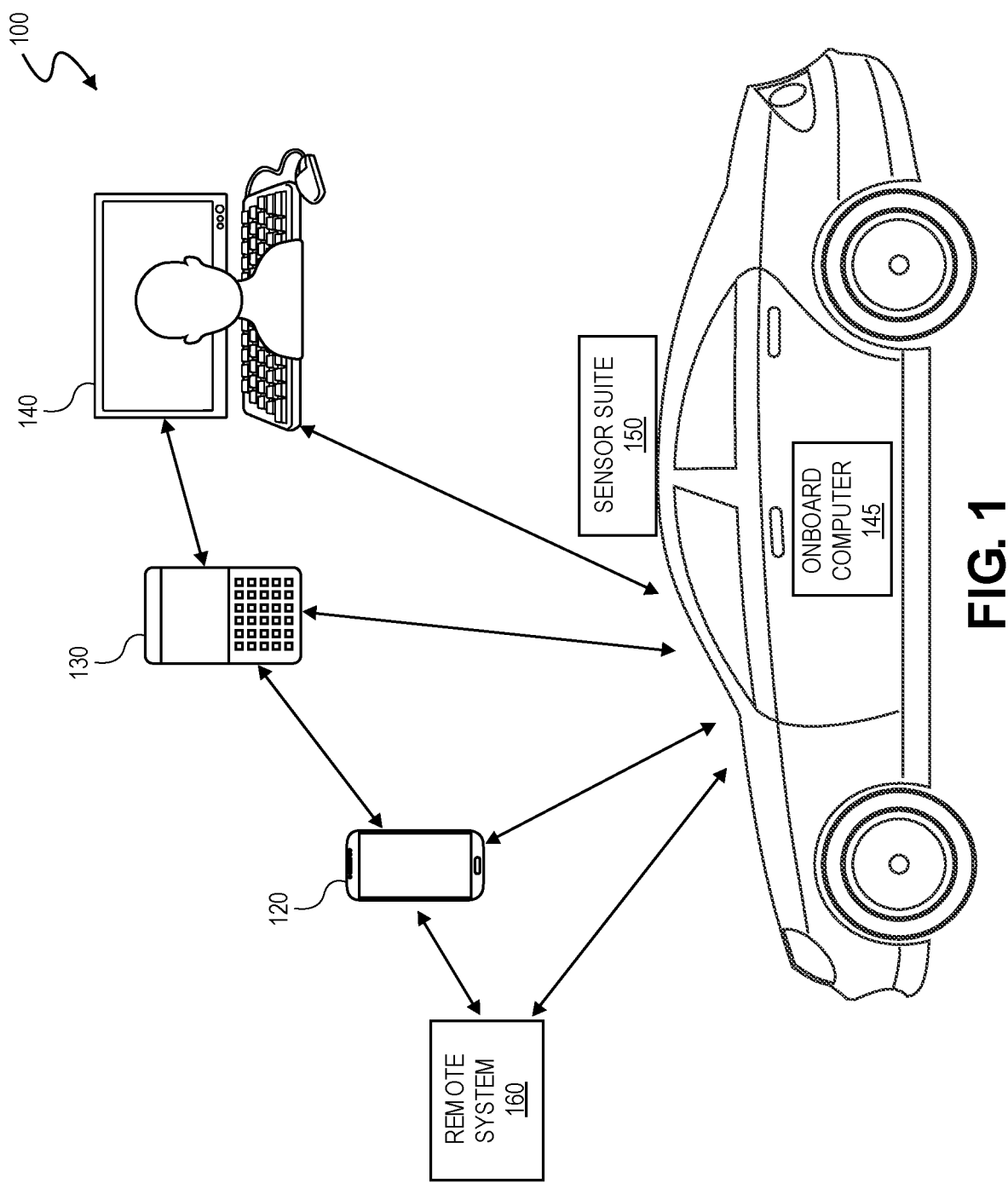
FIG. 1 is a block diagram illustrating an example autonomous vehicle (AV) in which an enhanced destination information system (EDIS) according to some embodiments of the present disclosure may be implemented.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

In many instances, rideshare service users may benefit from access to real time information regarding their intended destination, such as weather and related conditions, pedestrian density, lighting conditions, accessibility, etc., prior to selecting and/or confirming a specific drop-off point at the destination. Access to and provision of such information would enable users to better plan for their trip or to modify their selected drop-off point.

For example, a user may prefer to avoid large crowds, to avoid being dropped off after dark in a location that does not have operational streetlamps or other forms of artificial lighting, to avoid windy locations, or to avoid locations that are inconvenient or inaccessible due to physical limitations of the user.

In accordance with features of embodiments described herein, a rideshare user may opt in to a service for providing enhanced destination information ("Enhanced Destination Information Service" or "EDIS") by making appropriate selections in the user's profile maintained with the rideshare service provider to indicate the user's preferences. For example, the user may select conditions of interest (e.g., pedestrian density, lighting conditions) individually or may select all available conditions as conditions of interest. Additionally, within each selected condition, the user may specify thresholds or ranges of interest for the condition (e.g., a maximum level for pedestrian density that is not to be exceeded or a minimum level of lighting that must be exceeded during a range of hours). The user may further indicate a maximum distance from a selected drop-off point to be used in cases in which the selected drop-off point needs to be modified (as described below). Once the conditions and associated ranges/thresholds have been selected, the user may further select (either individually for each selected condition or collectively for all conditions) whether s/he would prefer to be alerted concerning existence of those conditions at the selected drop-off point, have her/his selected drop-off point automatically modified in accordance with her/his preferences, or both.

In accordance with features of embodiments described herein, as vehicles that make up the rideshare service provider's fleet (which in some embodiments may comprise one or more autonomous vehicles (AVs) drive through a service area, the vehicles collect visual images of their environment using the exterior cameras, as well as a variety of other types of information using other types of sensors with which the vehicle is fitted. The collected information is timestamped and location tagged and then may be sent to a remote computer to be post-processed to determine information such as pedestrian density in a scene. The post-processed information is stored in a real-time fleet information (RTFI) database.

In an example operation, when a user requests a ride to a destination and specifies a drop-off point, the RTFI database is queried to determine when a vehicle from the rideshare service fleet last drove by that location or in the vicinity of the location (depending on the information to be acquired per the user's profile settings). The resulting information is consolidated to be provided to the user and/or used to modify the drop-off point. For example, if a user requested to be dropped off at Ocean Beach, the following information may be sent to the user: "5 minutes ago at this location it was sunny, with approximately 100 pedestrians in view. An image is attached." Based on the user-selected preferences, alternative drop-off points could also be recommended. For example, if the user indicated s/he preferred to avoid crowds, the vehicle RTFI database to determine whether there was an alternate drop-off point near the requested one that had a lower pedestrian density at the time. This concept could be extended to provide updates during the ride. In particular, if during the ride, conditions at the originally selected drop-off point changes such that they no longer comply the user's preferences, the user could automatically be rerouted to or prompted to select a new drop-off point near the originally selected drop-off point that complies with the preferences the user specified in her/his profile. For example, if once the drop-off point is selected and the ride has commenced, the population density has increased to above a maximum threshold level specified by the user, the user may be provided with a list of alternative drop-off locations near the originally selected location that comply with the population density limitations.

As will be appreciated by one skilled in the art, aspects of the present disclosure described herein may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

As shown in FIG. 1, a system 100 embodying features described herein includes an autonomous vehicle 110 including a passenger interface 120, a vehicle coordinator 130, and/or a remote expert interface 140. In certain embodiments, the remote expert interface 140 allows a non-passenger entity to set and/or modify the behavior settings of the autonomous vehicle 110. The non-passenger entity may be different from the vehicle coordinator 130, which may be a server.

A remote facility 160, which may comprise a central office or backoffice facility, may also be provided for providing the autonomous vehicle 110 (and particularly, the onboard computer 145) with a number of different system backend functions. The remote facility 160 may include one or more switches, servers, databases, live advisors, and/or an automated voice response system ("VRS"). Remote facility 160 may include any or all of the aforementioned components, which may be coupled to one another via a wired or wireless local area network (LAN). Remote facility 160 may receive and transmit data via one or more appropriate devices and network from and to the autonomous vehicle 110, such as by wireless systems, such as 882.11x, General Packet Radio Service (GPRS), and the like. A database at the remote facility 160 can store account information such as subscriber authentication information, vehicle identifiers, profile records, behavioral patterns, and other pertinent subscriber information. The remote facility 160 may also include a database of roads, routes, locations, etc., comprising a service area permitted for use by autonomous vehicle 110. The remote facility 160 may communicate with the autonomous vehicle 110 to provide route guidance in response to a request received from the vehicle.

For example, as will be described in greater detail below, the remote facility 160 may receive and store destination data and images for use in implementing aspects of the EDIS described herein. Additionally, autonomous vehicles, such as the autonomous vehicle 110, may, in the course of determining a navigation route, receive instructions from the remote facility 160 regarding which roads or portions thereof, if any, are appropriate for use under certain circumstances, as well as which drop-off point should be used. Such instructions may be based in part on information received from the autonomous vehicle 110 or other autonomous vehicles regarding road and environmental conditions Accordingly, remote facility 160 may receive information regarding the roads/routes/environmental conditions generally in real-time from one or more vehicles comprising a rideshare service provider's fleet.

The system 100 functions to enable an autonomous vehicle 110 to modify and/or set a driving behavior in response to parameters set by vehicle passengers (e.g., via the passenger interface 120, which may include a user profile) and/or other interested parties (e.g., via the vehicle coordinator 130 or remote expert interface 140). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

The autonomous vehicle 110 preferably includes a throttle interface that controls an engine throttle, motor speed (e.g., rotational speed of electric motor), or any other movement-enabling mechanism; a brake interface that controls brakes of the autonomous vehicle (or any other movement-retarding mechanism); and a steering interface that controls steering of the autonomous vehicle (e.g., by changing the angle of wheels of the autonomous vehicle). The autonomous vehicle 110 may additionally or alternatively include interfaces for control of any other vehicle functions; e.g., windshield wipers, headlights, turn indicators, air conditioning, etc.

In addition, the autonomous vehicle 110 preferably includes an onboard computer 145 and a sensor suite 150 (e.g., computer vision ("CV") system, Light Detection and Ranging (LIDAR), Radio Detection and Ranging (RADAR), wheel speed sensors, Global Positioning System (GPS), cameras, and a variety of other sensors). The onboard computer 145 functions to control the autonomous vehicle 110 and processes sensed data from the sensor suite 150 and/or other sensors in order to determine the state of the autonomous vehicle 110. Based upon the vehicle state and programmed instructions, the onboard computer 145 preferably modifies or controls driving behavior of the autonomous vehicle 110.

Driving behavior may include any information relating to how an autonomous vehicle drives (e.g., actuates brakes, accelerator, steering) given a set of instructions (e.g., a route or plan). Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, action profiles (e.g., how a vehicle turns, changes lanes, or performs a driving maneuver), and action frequency constraints (e.g., how often a vehicle changes lanes).

The onboard computer 145 functions to control the operations and functionality of the autonomous vehicles 110 and processes sensed data from the sensor suite 150 and/or other sensors in order to determine states of the autonomous vehicles no. Based upon the vehicle state and programmed instructions, the onboard computer 145 preferably modifies or controls behavior of autonomous vehicles 110. The onboard computer 145 is preferably a general-purpose computer adapted for input/output I/O communication with vehicle control systems and sensor systems, but may additionally or alternatively be any suitable computing device. The onboard computer 145 is preferably connected to the Internet via a wireless connection (e.g., via a cellular data connection). Additionally or alternatively, the onboard computer 145 may be coupled to any number of wireless or wired communication systems.

The sensor suite 150 preferably includes localization and driving sensors; e.g., photodetectors, cameras, RADAR, Sound Navigation and Ranging (SONAR), LIDAR, GPS, inertial measurement units (IMUS), accelerometers, microphones, strain gauges, pressure monitors, barometers, thermometers, altimeters, etc.

In certain embodiments, information collected by autonomous vehicles, such as autonomous vehicle 110, may be provided to the remote facility 160, which may establish a database or map of routes in a given area or region where use of an autonomous driving system may be permitted. Information may be collected from vehicles in real-time, i.e., as the vehicle(s) traverses the route(s) in question. Information may be analyzed by a central office of the remote facility 160 in real-time, or on a periodic basis. The information may be provided to vehicles collectively in the area, e.g., by way of a central database or map. For example, vehicles may pull route information from the database/map to determine appropriate route(s) for use of an autonomous driving system in any manner that is convenient. In some examples, a vehicle telematics unit may selectively communicate with the remote facility to determine whether a route may be used with an autonomous driving system. In accordance with another aspect of the invention, there is provided a system for communicating with a plurality of vehicles may include a plurality of telematics units installed into each of the vehicles. The telematics units are configured to collect route information as the vehicles are traveling along a vehicle route.

Figure 2:
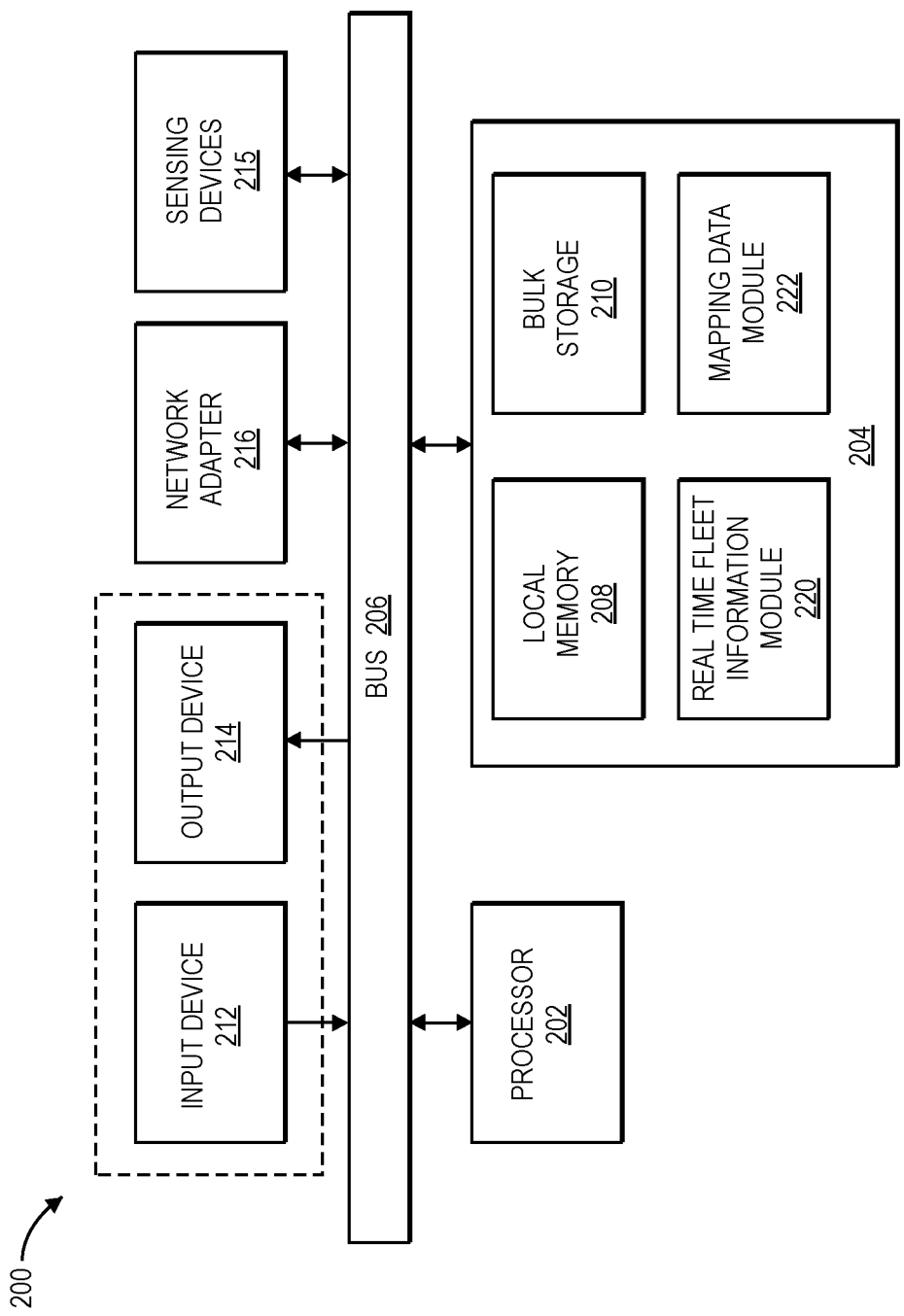
FIG. 2 is a block diagram illustrating an example EDIS according to some embodiments of the present disclosure.

FIG. 2 is a block diagram illustrating an example system 200 that may be configured to implement at least portions of a EDIS for an autonomous vehicle, such as the autonomous vehicle 110, in accordance with embodiments described herein, and more particularly as shown in the FIGURES described hereinabove. Part or all of the EDIS 200 may be implemented as a sensor suite, such as the sensor suite 150, and/or an onboard computer, such as onboard computer 145, and/or a remote system, such as remote facility 160. As shown in FIG. 2, the EDIS 200 may include at least one processor 202, e.g. a hardware processor 202, coupled to memory elements 204 through a system bus 206. As such, the system may store program code and/or data within memory elements 204. Further, the processor 202 may execute the program code accessed from the memory elements 204 via a system bus 206. In one aspect, the system may be implemented as a computer that is suitable for storing and/or executing program code (e.g., onboard computer 145). It should be appreciated, however, that the system 200 may be implemented in the form of any system including a processor and a memory that is capable of performing the functions described in this disclosure.

In some embodiments, the processor 202 can execute software or an algorithm to perform the activities as discussed in this specification; in particular, activities related to an EDIS for an autonomous vehicle in accordance with embodiments described herein. The processor 202 may include any combination of hardware, software, or firmware providing programmable logic, including by way of non-limiting example a microprocessor, a digital signal processor (DSP), a field-programmable gate array (FPGA), a programmable logic array (PLA), an integrated circuit (IC), an application specific IC (ASIC), or a virtual machine processor. The processor 202 may be communicatively coupled to the memory element 204, for example in a direct-memory access (DMA) configuration, so that the processor 202 may read from or write to the memory elements 204.

In general, the memory elements 204 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the system 200 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures may also include suitable interfaces for receiving, transmitting, and/or otherwise communicating data or information in a network environment so that they can communicate with, for example, a system having hardware similar or identical to another one of these elements.

In certain example implementations, mechanisms for implementing an EDIS for an autonomous vehicle as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 204 shown in FIG. 2, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 202 shown in FIG. 2, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 204 may include one or more physical memory devices such as, for example, local memory 208 and one or more bulk storage devices 210. The local memory may refer to RAM or other non-persistent memory device(s) generally used during actual execution of the program code. A bulk storage device may be implemented as a hard drive or other persistent data storage device. The processing system 200 may also include one or more cache memories (not shown) that provide temporary storage of at least some program code in order to reduce the number of times program code must be retrieved from the bulk storage device 210 during execution.

As shown in FIG. 2, the memory elements 204 may store a real-time fleet information (RTFI) module 220 and a mapping data module 222. In various embodiments, the modules 220, 222, may be stored in the local memory 208, the one or more bulk storage devices 210, or apart from the local memory and the bulk storage devices. It should be appreciated that the system 200 may further execute an operating system (not shown in FIG. 2) that can facilitate execution of the modules 220, 222. The modules 220, 222, being implemented in the form of executable program code and/or data, can be read from, written to, and/or executed by the system 200, e.g., by the processor 202. Responsive to reading from, writing to, and/or executing one of the modules 220, 222, the system 200 may be configured to perform one or more operations or method steps described herein.

Input/output (I/O) devices depicted as an input device 212 and an output device 214, optionally, may be coupled to the system. Examples of input devices may include, but are not limited to, a keyboard, a pointing device such as a mouse, or the like. Examples of output devices may include, but are not limited to, a monitor or a display, speakers, or the like. In some implementations, the system may include a device driver (not shown) for the output device 214. Input and/or output devices 212, 214 may be coupled to the system 200 either directly or through intervening I/O controllers. Additionally, sensing devices 215, may be coupled to the system 200. Examples of sensing devices 215 may include, but are not limited to, cameras (located inside and/or outside the vehicle), LIDARs, RADARS, scales, quick response (QR) code readers, bar code readers, radio frequency (RF) sensors, and others. Sensing devices 215 may be coupled to the system 200 either directly or through intervening controllers and/or drivers.

Cameras may be implemented using high-resolution imagers with fixed mounting and field of view. LIDARs may be implemented using scanning LIDARs with dynamically configurable field of view that provides a point-cloud of the region intended to scan. RADARs may be implemented using scanning RADARs with dynamically configurable field of view.

In an embodiment, the input and the output devices may be implemented as a combined input/output device (illustrated in FIG. 2 with a dashed line surrounding the input device 212 and the output device 214). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 216 may also, optionally, be coupled to the system 200 to enable it to become coupled to other systems, computer systems, remote network devices, and/or remote storage devices through intervening private or public networks. The network adapter may comprise a data receiver for receiving data that is transmitted by said systems, devices and/or networks to the system 200, and a data transmitter for transmitting data from the system 200 to said systems, devices and/or networks. Modems, cable modems, and Ethernet cards are examples of different types of network adapter that may be used with the system 200.

Figure 3:
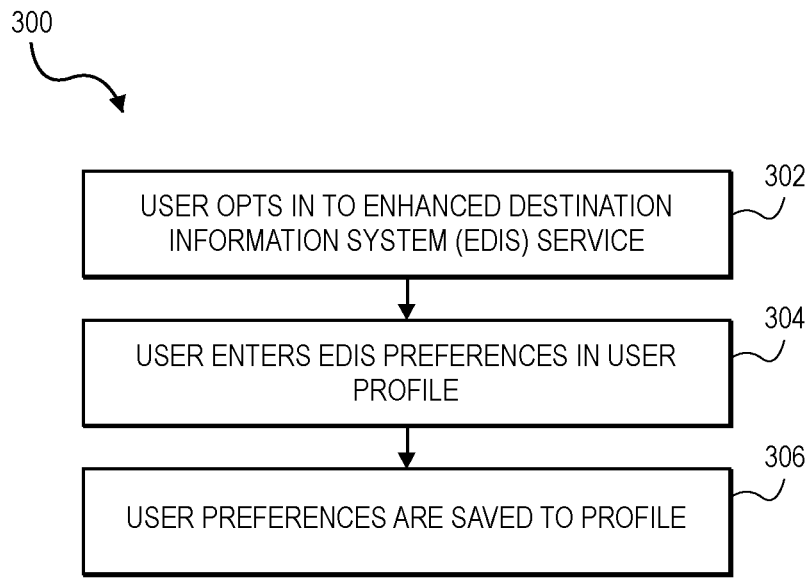
FIG. 3 is a flowchart of an example method of using the EDIS of FIG. 2 to set up EDIS preferences according to some embodiments of the present disclosure.

FIG. 3 is a flowchart of an example method 300 of using an EDIS, such as the EDIS 200 of FIG. 2, according to some embodiments of the present disclosure. In particular, FIG. 3 illustrates a method of interacting with a passenger interface 120, which may comprise a rideshare application (or rideshare app) that may be used to access a profile of the user via a mobile communications device, for example.

In step 302, a user opts in to the EDIS service; e.g., by selecting a corresponding option in her/his user profile.

In step 304, a variety of available EDIS parameters are presented to the user (e.g., displayed via the passenger interface/user profile) for enabling the user to specify drop-off point condition preferences. For each of the presented parameters, the user may be provided with an opportunity to activate or deactivate the parameter. Moreover, for each activated parameter, the user may be provided with an opportunity to further refine the parameter (e.g., by specifying a threshold or other limiting factor for determining compliance of the drop-off point condition with the parameter), to specify whether the user would like to be advised (e.g., via text or in-app messaging) of conditions of the selected drop-off point that do not comply with the parameter as optionally refined (and in how much detail), and to specify whether, in cases in which the conditions of the selected drop-off point do not comply with the parameters as optionally refined, the user would like the drop-off point to be automatically modified/changed or whether the user would prefer to be provided with a list of options of alternative drop-off points from which to select.

The user may also be provided with options that may be selected in connection with single parameters or that may be applied globally, such as whether conditions at the selected drop-off point should be monitored throughout the ride (with the drop-off point being modified or alternative options presented if at any point certain ones or all of the selected parameters are not complied with) or just at the point of ride request, and a limit on the maximum distance between the originally selected drop-off point and alternative drop-off points suggested or deployed.

The parameters may also be selectively conditionally activated and/or refined based on ride-specific factors, such as whether the user is alone (in which case, s/he may not want to be dropped off in a dark location at night) or with others (in which case, s/he may not be as worried about the lighting conditions at the drop-off point at night), the time of day (e.g., rush hour vs. mid-afternoon; day vs. night), week (e.g., weekday vs. weekend), or year (e.g., summer vs. winter, holiday vs. non-holiday), a geographic location of the service area in which the user is traveling (e.g., a large city vs. a rural area), weather conditions (e.g., rainy vs. sunny), environmental conditions (e.g., snow on the ground vs. clear), or a combination of one or more of those, all of which is configurable by the user via the user's profile settings. The user may also be permitted to indicate a relative importance of the activated parameters. For example, while both pedestrian density and accessibility may both be important to a user, one may be more important than the other and the relative importance may have a direct impact on which of several drop off points would be more preferable to the user, all else being equal. Parameter settings may also be optionally proactively suggested by the system based on demographics of the passenger (e.g., a well-lit drop-off location may be suggested for a young, female passenger and a highly accessible drop-off location may be suggested for an elderly passenger).

It should be noted that the parameters presented to a user in step 304 may include any environmental or other condition associated with a potential drop-off location that may be sensed or "seen" by a sensor or camera (or camera-type) device and that may impact a user's desire to be dropped off at that location, including, but not limited to, weather quality, air quality, lighting, traffic level, road quality (e.g., existence of potholes that may be filled with water, steep incline, etc.), accessibility (e.g., proximity of curb ramps, sidewalks, construction in the area, etc.), noise (e.g., crowd noise, sirens, traffic noise, etc.), pedestrian density, time (e.g., time of year, time of week, time of day), visibility (e.g., due to weather or lighting conditions), and so on.

In step 306, after the user has finished entering her/his EDIS preferences, the preferences are saved.

Figure 4:
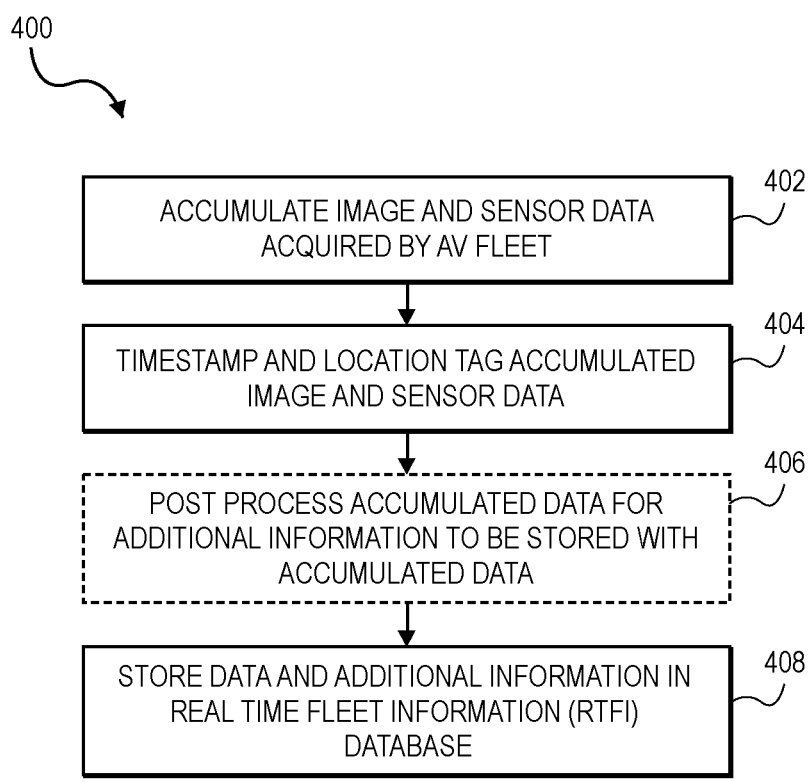
FIG. 4 is a flowchart of an example method implemented by the EDIS of FIG. 2 for accumulating real time fleet information (RTFI) regarding a requested destination according to some embodiments of the present disclosure.

FIG. 4 is a flowchart of an example method 400 implemented by an EDIS, such as the EDIS 200 of FIG. 2, for accumulating real time fleet information regarding a requested user destination according to some embodiments of the present disclosure.

In step 402, various types of sensor data and images are gathered by a fleet of AVs during normal operation as the AVs move through a service area providing ride share services. In certain embodiments, one or more AVs or other vehicles may be dispatched within the service area specifically to gather data. Images gathered by the AVs may include, for example, images from cameras, CV, RADAR, and LIDAR and may depict the environment around the AV. Sensor information may include, for example, weather information (e.g., temperature, precipitation, wind) and ambient lighting conditions.

In step 404, the sensor data and images are time-stamped and location-tagged.

In an optional step 406, post-processing is performed on the sensor data and/or images to determine additional information contained in the data/images. For example, images may be further processed to determine pedestrian density at a location or to determine whether the location is wheelchair accessible. Post-processing of images may also be used to determine lighting conditions at a location (e.g., are lights on or off) or an approximate percentage of pedestrians that are wearing masks or sunglasses, for example.

In step 408, the sensor data, images, and any additional information acquired from post processing are stored in an RTFI database.

It will be recognized that the method 400 may preferably be executed continuously for each AV in the fleet while the AV is in service.

Figure 5:
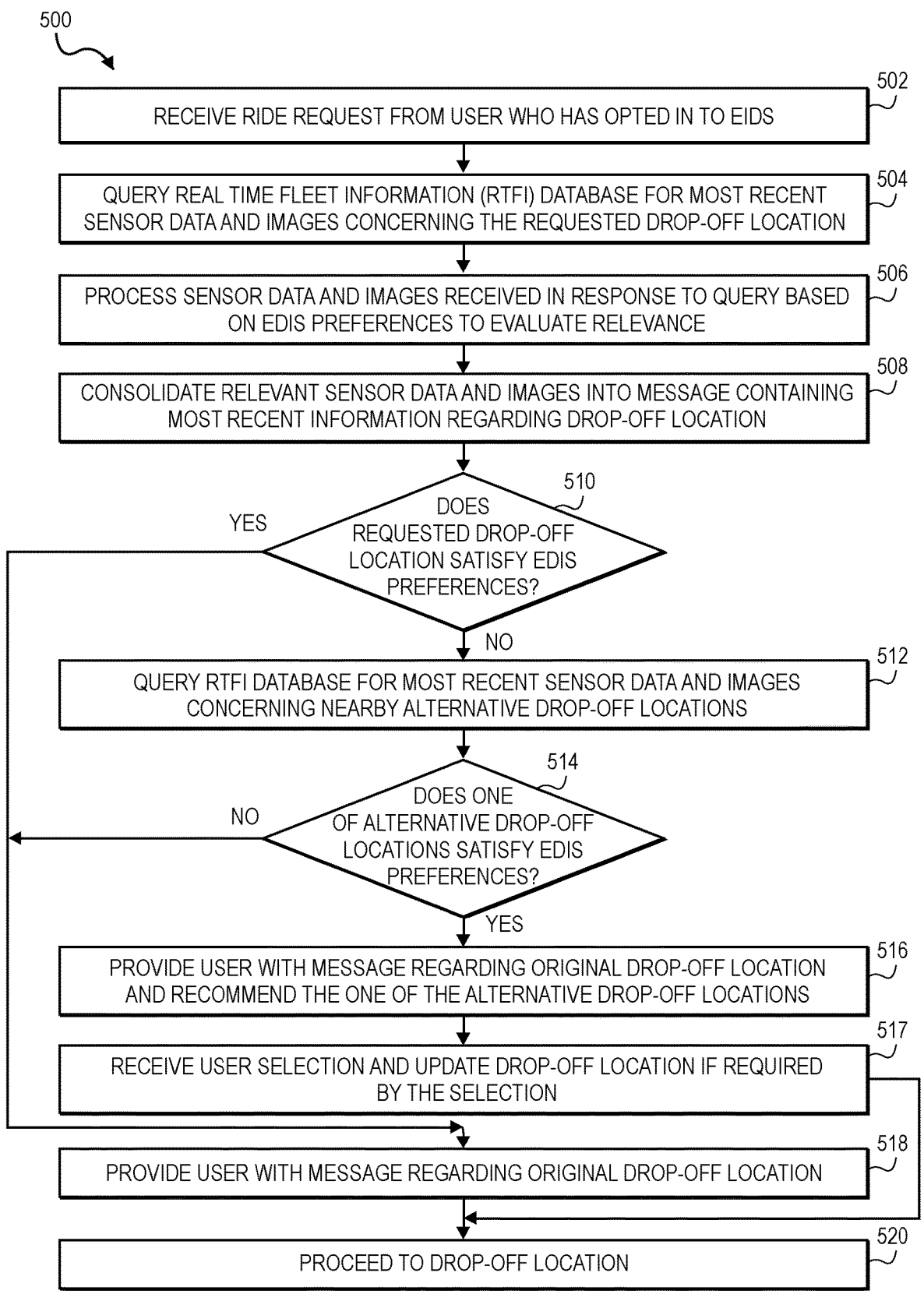
FIG. 5 is a flowchart of an example method implemented by the EDIS of FIG. 2 for utilizing RTFI stored in a database in connection with a ride requested by a user according to some embodiments of the present disclosure.

FIG. 5 is a flowchart of an example method 500 implemented by an EDIS, such as the EDIS 200 of FIG. 2, for utilizing RTFI in connection with a ride requested by a user according to some embodiments of the present disclosure.

In step 502, a user who has previously opted into the EDIS service (e.g., as illustrated in FIG. 3) requests a ride to a drop-off location.

In step 504, the RTFI database is queried for the most recent data and images (e.g., based on data/image timestamps) regarding the requested drop-off location (e.g., based on data/image location tags).

In step 506, the data and images from the RTFI database obtained in response to the query are processed based on the EDIS preferences specified in the user's profile to determine their respective relevance. In particular, if the user has activated a "pedestrian density" parameter in her/his user profile, an image showing pedestrians in the area of the designated destination would be considered relevant. In contrast, if the user has not expressed a preference with regard to pedestrian density, the image would be considered irrelevant.

In step 508, the relevant data and image(s) are consolidated into a message containing the most recent information.

In step 510, a determination is made whether conditions at the drop-off location satisfy the user preferences as set forth in the user's profile. If not, execution proceeds to step 512.

In step 512, the RTFI database is queried for the most recent data and images regarding one or more nearby, alternative drop-off locations. It will be recognized that what qualifies as an alternative drop-off location will be restricted by user preferences with regard to maximum allowable distance from the original drop-off location.

In step 514, a determination is made whether one of the alternative drop-off location better satisfies the user's preferences as set forth in the user's profile. If so, execution proceeds to step 516.

In step 516, the user is provided with the message developed in step 508 and the alternative drop-off location determined in step 514 is recommended to the user. Alternatively, if more than one of the alternative drop-off locations are determined to better satisfy the user's preferences in step 514, all of those alternatives may be presented to the user in step 518.

In step 517, the user's response concerning drop-off location (original or recommended alternative (or one of the recommended alternatives) is awaited.

If it is determined in step 514 that none of the alternative drop-off locations better satisfies the user's preferences, execution proceeds to step 518, in which the message developed in step 508 is provided to the user. Alternatively, the user may be provided with an option to postpone the ride, cancel the ride, or expand the radius of acceptable drop-off locations.

Similarly, if it is determined in step 510 that the original drop-off location does satisfy the user's preferences, execution also proceeds to step 518, in which the message developed in step 508 is provided to the user.

Upon completion of either of steps 517 or 518, execution proceeds to step 520, in which the AV proceeds to the selected drop-off location (either original or alternative).

In an alternative embodiment, if a negative determination is made in step 514, the user may be additionally provided with the option to cancel or postpone the requested ride and/or to expand the radius of acceptable alternative drop-off locations.

It will be recognized that steps 504-518 may be performed executed only prior to commencement of the ride or continuously throughout the ride, if that option has been enabled by the user. In the latter case, the conditions at the selected drop-off location will be continually monitored, with alternative drop-off locations being proposed if at any point, the user's preferences are not met by the current drop-off location.

In alternative embodiments, user preferences may be learned over time, with the system suggesting updates to EDIS preferences specified in the user's profile as appropriate. Moreover, trend data associated with a drop-off location may be evaluated in addition to the most recent sensor data and images or may be evaluated instead of sensor data/images if acceptably recent sensor data/images are available for any reason.

Example 1 is a method including receiving a ride request from a user having a user profile, the ride request including a requested drop-off location within a service area and the user profile specifying at least one drop-off location preference parameter; querying a database to obtain data regarding a condition of the requested drop-off location, wherein the data is collected by a plurality of vehicles traversing the service area and equipped with at least one of at least one sensor and at least one imaging device; determining whether the obtained data satisfies the at least one drop-off location preference parameter; and determining at least one alternative drop-off location within a first distance from the requested drop-off location if the obtained data does not satisfy the at least one drop-off location preference parameter.

In Example 2, the method of Example 1 may further include dropping off the user at the requested drop-off location if the obtained data satisfies the at least one drop-off location preference parameter.

In Example 3, the method of any of Examples 1-2 may further include the first distance being specified by the user in the user profile.

In Example 4, the method of any of Examples 1-3 may further include providing the user with a message including information regarding the condition of the requested drop-off location.

In Example 5, the method of any of Examples 1-4 may further include providing the user a recommendation regarding the at least one alternative drop-off location.

In Example 6, the method of any of Examples 1-5 may further include prompting the user to select one of the requested drop-off location and the at least one alternative drop-off location; and dropping the user off at the selected one of the drop-off locations.

In Example 7, the method of any of Examples 1-6 may further include querying the database to obtain data regarding a condition of the at least one alternative drop-off location; determining whether the obtained data regarding the condition of the at least one alternative drop-off location satisfies the at least one drop-off location preference parameter; and if the obtained data regarding the condition of the at least one alternative drop-off location does not satisfy the at least one drop-off location preference parameter, prompting the user to select at least one of canceling the requested ride, postponing the requested ride, and increasing a value of the first distance.

In Example 8, the method of any of Examples 1-7 may further include the drop-off location preference parameter indicating a user preference with regard to at least one of a noise level at the drop-off location, a pedestrian density level at the drop-off location, accessibility conditions at the drop-off location, road quality at the drop-off location, weather quality at the drop-off location, visibility at the drop-off location, and lighting at the drop-off location.

In Example 9, the method of any of Examples 1-8 may further include a preference expressed by the drop-off location preference parameter being dependent on at least one of time of day, time of week, and time of year.

In Example 10, the method of any of Examples 1-9 may further include a preference expressed by the drop-off location preference parameter being dependent on a geographic location of the service area.

In Example 11, the method of any of Examples 1-10 may further include a preference expressed by the drop-off location preference parameter being dependent on a number of passengers.

In Example 12, the method of any of Examples 1-11 may further include a preference expressed by the drop-off location preference parameter being learned over time.

In Example 13, the method of any of Examples 1-12 may further include a preference expressed by the drop-off location preference parameter being set by the user.

In Example 14, the method of any of Examples 1-13 may further include a preference expressed by the drop-off location preference parameter being based on demographic information regarding the user.

Example 15 is a destination information system for a ride share service, the ride share service for transporting a user in response to receipt of a ride request including a requested drop-off location, the destination information system including a database for storing data collected by a plurality of vehicles traversing the service area and equipped with at least one of at least one sensor and at least one imaging device for collecting the data; and a real time fleet information (RTFI) module configured to, in receipt of the ride request query the database to obtain data regarding a condition of the requested drop-off location, wherein the data is collected by a plurality of vehicles traversing the service area and equipped with at least one sensor and at least one imaging device; determine whether the obtained data satisfies at least one drop-off location preference parameter specified in a user profile associated with the user in connection with the ride share service; and determine at least one alternative drop-off location within a first distance from the requested drop-off location if the obtained data does not satisfy the at least one drop-off location preference parameter.

In Example 16, the destination information system of Example 15 may further include the RTFI module being further configured to provide the user with a message including information regarding the condition of the requested drop-off location.

In Example 17, the destination information system of any of Examples 15-16 may further include the RTFI module being further configured to provide the user a recommendation regarding the at least one alternative drop-off location; and prompt the user to select one of the requested drop-off location and the at least one alternative drop-off location.

In Example 18, the destination information system of any of Examples 15-17 may further include the drop-off location preference parameter indicating a user preference with regard to a at least one of a noise level at the drop-off location, a pedestrian density level at the drop-off location, accessibility conditions at the drop-off location, road quality at the drop-off location, weather quality at the drop-off location, environmental conditions at the drop-off location, visibility at the drop-off location, and lighting at the drop-off location.

Example 19 is a method including accumulating data collected by a plurality of vehicles traversing a service area, wherein the data comprises at least one of sensor data and image data generated by equipment associated with the vehicles; time stamping and location tagging the accumulated data; post-processing the data to determine additional information concerning a location with which the data is associated; and storing the data and the additional information in a database; wherein in response to receipt of a ride request from a user having a user profile, the ride request including a requested drop-off location within the service area and the user profile specifying at least one drop-off location preference parameter, the database is queried to obtain a portion of the data concerning the requested drop-off location and a determination is made whether the obtained portion of the data satisfies the at least one drop-off location preference parameter.

In Example 20, the method of Example 19 may further include, if the obtained portion of the data does not satisfy the at least one drop-off location preference parameter, at least one alternative drop-off location within a first distance from the requested drop-off location being determined and suggested to the user.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to contactless current measurement using magnetic sensors, e.g. those summarized in the one or more processes shown in FIGS., illustrate only some of the possible functions that may be executed by, or within, the current measurement systems illustrated in the FIGS. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
    subsequent to fleet management system associated with a rideshare service receiving an electronic ride request from a user having a user profile accessible by the fleet management system, the ride request specifying a pick-up location and a requested drop-off location within a service area and the user profile specifying at least one drop-off location preference parameter, dispatching by the fleet management system a selected vehicle to the pick-up location;
    collecting, by a plurality of other vehicles traversing the service area data, wherein the collected data is generated by sensors and imaging devices installed on the other vehicles storing the collected data in a database;
    post-processing the collected data to determine additional information contained in the collected data, wherein the additional information comprises at least one of pedestrian density, lighting conditions, characteristics of pedestrians, and wheelchair accessibility;
    storing the additional information with the collected data in the database;
    querying the database to determine a condition of the requested drop-off location based on the collected data stored in the database;
    comparing the condition of the requested drop-off location to the at least one drop-off location preference parameter;
    determining based on the comparing that the condition of the requested drop-off location satisfies the at least one drop-off location preference parameter;
    subsequent to the determination that the condition of the requested drop-off location does not satisfy the at least one drop-off location preference parameter:
    determining at least one alternative drop-off location within a first distance from the requested drop-off location, wherein the first distance is specified by the user in the user profile;
    querying the database to determine a condition of the at least one alternative drop-off location; and
    comparing the determined condition of the at least one alternative drop off location to the at least one drop-off location preference parameter to determine whether the condition of the at least one alternative drop-off location satisfies the at least one drop-off location preference parameter; and
    providing computer-executable routing instructions to an autonomous driving system of the selected vehicle to cause the selected vehicle to drive to the requested drop-off location or the determined at least one alternative drop-off location.

2. The method of claim 1 further comprising, if the condition of the requested drop-off location satisfies the at least one drop-off location preference parameter, providing routing instructions to the autonomous vehicle driving system to cause the selected vehicle to drive to the requested drop-off location.

3. The method of claim 1 further comprising providing the user with an electronic message including information regarding the condition of the requested drop-off location, wherein the electronic message is provided using a computer device.

4. The method of claim 3 further comprising providing the user with an electronic recommendation regarding the at least one alternative drop-off location, wherein the electronic recommendation is provided using the computer device.

5. The method of claim 4 further comprising:
prompting the user to select one of the requested drop-off location and the at least one alternative drop-off location; and
providing routing instructions to the autonomous vehicle driving system to cause the selected vehicle to drive to the selected one of the drop-off locations.

6. The method of claim 1 further comprising:
subsequent to a determination that the condition of the at least one alternative drop-off location does not satisfy the at least one drop-off location preference parameter, prompting the user to select at least one of canceling the requested ride, postponing the requested ride, and increasing a value of the first distance, wherein the prompting is performed using a computer device.

7. The method of claim 1, wherein the drop-off location preference parameter indicates a user preference with regard to at least one of a current noise level at the drop-off location, a current pedestrian density level at the drop-off location, current weather conditions at the drop-off location, current visibility at the drop-off location, and current lighting conditions at the drop-off location.

8. The method of claim 1, wherein a preference expressed by the drop-off location preference parameter is dependent on at least one of time of day, time of week, and time of year.

9. The method of claim 1, wherein a preference expressed by the drop-off location preference parameter is dependent on a geographic location of the service area.

10. The method of claim 1, wherein a preference expressed by the drop-off location preference parameter is dependent on a number of passengers.

11. The method of claim 1, wherein a preference expressed by the drop-off location preference parameter is learned over time.

12. The method of claim 1, wherein a preference expressed by the drop-off location preference parameter is set by the user.

13. The method of claim 1, wherein a preference expressed by the drop-off location preference parameter is based on demographic information regarding the user.

14. A destination information system for a ride share service, the ride share service for transporting a user in response to receipt of a ride request including pick-up location and a requested drop-off location, the destination information system comprising:
a processor configured to execute program code;
a database accessible by the processor and storing data collected by a plurality of other vehicles traversing the service area, wherein the collected data is generated by sensors and imaging devices installed on the other vehicles; and
a real time fleet information (RTFI) module comprising program code stored on non-transitory media that when executed by the processor causes the system to, in receipt of the ride request:
dispatch a selected vehicle to the pick-up location;
query the database to determine a condition of the requested drop-off location based on the collected data stored in the database;
post-process the collected data to determine additional information contained in the collected data, wherein the additional information comprises at least one of pedestrian density, lighting conditions, characteristics of pedestrians, and wheelchair accessibility;
store the additional information with the collected data in the database;
compare the condition of the requested drop off location to the at least one drop-off location preference parameter to determine based on the comparing whether the condition of the requested drop-off location satisfies the at least one drop-off location preference parameter;
subsequent to a determination that the condition of the requested drop-off location does not satisfy the at least one drop-off location preference parameter:
determine at least one alternative drop-off location within a first distance from the requested drop-off location, wherein the first distance is specified by the user in the user profile;
query the database to determine a condition of the at least one alternative drop-off location;
compare the condition of the at least one alternative drop off location to the at least one drop-off location preference parameter to determine whether the condition of the at least one alternative drop-off location satisfies the at least one drop-off location preference parameter; and
provide computer-executable routing instructions to an autonomous driving system of the selected vehicle to cause the selected vehicle to drive to the requested drop-off location or the determined at least one alternative drop-off location.

15. The destination information system of claim 14 wherein the RTFI module further comprises program code that, when executed by the processor, causes the system to provide the user with an electronic message including information regarding the condition of the requested drop-off location.

16. The destination information system of claim 14 wherein the RTFI module further comprises program code that, when executed by the processor, causes the system to:
provide the user with an electronic recommendation regarding the at least one alternative drop-off location; and
prompt the user to select one of the requested drop-off location and the at least one alternative drop-off location.

17. The destination information system of claim 14, wherein the drop-off location preference parameter indicates a user preference with regard to at least one of a current noise level at the drop-off location, a current pedestrian density level at the drop-off location, current weather conditions at the drop-off location, current visibility at the drop-off location, and current lighting conditions at the drop-off location.

* * * * *